United States Patent [19]
Venham et al.

[11] Patent Number: 5,232,988
[45] Date of Patent: Aug. 3, 1993

[54] BLOCKED POLYISOCYANATES PREPARED FROM PARTIALLY TRIMERIZED CYCLIC ORGANIC DIISOCYANATES HAVING (CYCLO)ALIPHATICALLY BOUND ISOCYANATE GROUPS AND THEIR USE FOR THE PRODUCTION OF COATINGS

[75] Inventors: Lanny D. Venham, Paden City, W. Va.; Marianne M. Salek, Oakdale; Terry A. Potter, Beaver, both of Pa.

[73] Assignee: Miles Inc., Pittsburgh, Pa.

[21] Appl. No.: 841,130

[22] Filed: Feb. 25, 1992

[51] Int. Cl.$^5$ .............................................. C08G 18/80
[52] U.S. Cl. ................................ 525/124; 525/440; 252/182.2; 252/182.21; 528/45; 528/49; 428/422.8
[58] Field of Search ............................. 525/124, 440; 252/182.2, 182.21; 528/45, 49; 428/422.8

[56] References Cited
U.S. PATENT DOCUMENTS 4,246,380  1/1981  Gras et al. ............................. 528/45

Primary Examiner—Maurice J. Welsh
Attorney, Agent, or Firm—Joseph C. Gil; Thomas W. Roy

[57] ABSTRACT

The present invention relates to a blocked polyisocyanate which is based on the reaction product of a polyisocyanate with a reversible, monofunctional blocking agent for isocyanate groups, wherein the polyisocyanate is prepared by trimerizing 5 to 85% of the isocyanate groups of a cyclic organic diisocyanate having (cyclo)aliphatically bound isocyanate groups and contains i) an isocyanurate group-containing polyisocyanate and
ii) at least 5% by weight, based on the weight of the polyisocyanate, of unreacted diisocyanate.

The present invention also relates to a one-component coating composition containing this blocked polyisocyanate and a polyhydroxyl polyacrylate and/or a polyhydroxyl polyester.

Finally, the present invention relates to substrates coated with this coating composition.

23 Claims, No Drawings

BLOCKED POLYISOCYANATES PREPARED FROM PARTIALLY TRIMERIZED CYCLIC ORGANIC DIISOCYANATES HAVING (CYCLO)ALIPHATICALLY BOUND ISOCYANATE GROUPS AND THEIR USE FOR THE PRODUCTION OF COATINGS

BACKGROUND OF THE INVENTION

1. Field of the Invention

The present invention relates to blocked polyisocyanates prepared by blocking partially trimerized cyclic organic diisocyanates having (cyclo)aliphatically bound isocyanate groups, to one-component coating compositions containing this blocked polyisocyanate and a polyhydroxyl component and to the coatings obtained therefrom.

2. Description of the Prior Art

There is a need in the automotive industry for a clear topcoat which can be applied over existing basecoats and which provides improved environmental etch resistance. The thermoset melamine/acrylics which are conventionally used as the clearcoat suffer from poor resistance to acid rain, bird droppings, tree sap, etc.

Recently, two-component polyurethane coatings have increasingly been used as clearcoats. These coatings possess excellent environmental etch resistance and also possess many other excellent properties such as appearance, durability, hardness and flexibility. However, the two-component polyurethane coating compositions suffer from one major disadvantage. They require two-component spray equipment as opposed to the conventional thermoset melamine/acrylics which are applied using one-component equipment. Therefore, an additional capital expenditure is required to obtain the necessary spray equipment for applying the two-component polyurethane coating compositions.

Accordingly, it is an object of the present invention to provide a one-component system which overcomes the disadvantages of the two-component polyurethane coating compositions.

This object may be achieved in accordance with the present invention by the use of the blocked polyisocyanates described hereinafter. The fact that these blocked polyisocyanates may be used for production of coatings with improved environmental etch resistance is surprising because the polyisocyanates used for the blocking reaction contain unreacted monomer. It would be expected that the presence of monomer, which lowers the average functionality of the polyisocyanate, would reduce the amount of crosslinking and result in coatings with reduced environmental etch resistance.

SUMMARY OF THE INVENTION

The present invention relates to a blocked polyisocyanate which is based on the reaction product of a polyisocyanate with a reversible, monofunctional blocking agent for isocyanate groups, wherein the polyisocyanate is prepared by trimerizing 5 to 85% of the isocyanate groups of a cyclic organic diisocyanate having (cyclo)aliphatically bound isocyanate groups and contains i) an isocyanurate group-containing polyisocyanate and ii) at least 5% by weight, based on the weight of the polyisocyanate, of unreacted diisocyanate.

The present invention also relates to a one-component coating composition containing this blocked polyisocyanate and a polyhydroxyl polyacrylate and/or a polyhydroxyl polyester.

Finally, the present invention relates to substrates coated with this coating composition.

DETAILED DESCRIPTION OF THE INVENTION

The polyisocyanate component, which is blocked with the reversible, monofunctional blocking agent for isocyanate groups, is a mixture of i) polyisocyanates containing isocyanurate groups and ii) unreacted starting diisocyanate. The amounts of the individual components are controlled by the percentage of isocyanate groups which are trimerized to form isocyanurate groups. The final product contains at least 5%, preferably at least 10% of unreacted diisocyanate. The isocyanate content of the polyisocyanate component increases as the amount of unreacted diisocyanate increases. To the contrary the isocyanate content decreases as the amount of component i) increases.

In accordance with the present invention at least 5%, preferably at least 20% and more preferably at least 25%, of the isocyanate groups are trimerized. The upper limit for the amount of isocyanate groups which are trimerized is 85% or less, preferably 75% or less and more preferably 65% or less.

The polyisocyanates containing isocyanurate groups are prepared by trimerizing a portion of the isocyanate groups of a cyclic diisocyanate having (cyclo)aliphatically bound isocyanate groups. The term "(cyclo)aliphatic" is defined to include both aliphatically and/or cycloaliphatically bound isocyanate groups. The cyclic groups may be either aromatic or cycloaliphatic, provided that the isocyanate groups are (cyclo)aliphatically bound. Examples of these cyclic diisocyanates include cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 1,3- and 1,4-bis-(isocyanatomethyl)-cyclohexane (HMDI), bis-(4-isocyanato-3-methylcyclohexyl)-methane, xylylene diisocyanate, α, α, α', α'-tetramethyl-1,3- and/or -1,4-xylylene diisocyanate, 1-isocyanato-1-methyl-4(3)-isocyanatomethyl cyclohexane, and 2,4- and/or 2,6-hexahydrotoluylene diisocyanate. Mixtures of cyclic diisocyanates may also be used. Preferred cyclic diisocyanates are HMDI and IPDI, with HMDI being especially preferred.

The trimerization reaction is terminated when the desired percentage of isocyanate groups has been trimerized. However, it is possible to terminate the reaction before the desired percentage of isocyanate groups has been trimerized and then remove unreacted HMDI from the mixture, e.g., by distillation, until a product is obtained which contains the desired percentage of trimerized isocyanate groups. It is also possible to trimerize more than 85% of the isocyanate groups and then add starting diisocyanate until the percent of trimerized isocyanate groups is within the disclosed ranges. These latter two embodiments require additional process steps and, thus, are not preferred.

In accordance with the present invention it is also possible to use a blend the cyclic diisocyanates with another organic diisocyanate, preferably an aliphatic diisocyanate, for use as the starting material for the trimerization reaction. The most preferred diisocyanate for this purpose is 1,6-hexamethylene diisocyanate. The other diisocyanates may be blended with the cyclic diisocyanates in an amount of up to 30 weight percent, preferably 20 weight percent and more preferably 10 weight percent, based on the total weight of the diisocyanate starting material. Most preferably, the cyclic diisocyanates are used as the sole starting material. It is also possible to blend these other diisocyanates or polyisocyanate adducts prepared therefrom with the partial trimer of the cyclic diisocyanates.

In accordance with the present invention it is preferred to treat the starting diisocyanate prior to or during the trimerization reaction by bubbling an inert gas such as nitrogen through the starting diisocyanate in order to reduce the content of carbon dioxide. This process is discussed in German Offenlegungsschrift 3,806,276 (U.S. application, Ser. No. 07/311,920).

Trimerization catalysts which are suitable for preparing the partial trimers according to the invention include those previously known such as alkali phenolates of the type described in GB-PS 1,391,066 or GB-PS 1,386,399; aziridine derivatives in combination with tertiary amines of the type described in U.S. Pat. No. 3,919,218; quaternary ammonium carboxylates of the type described in U.S. Pat. Nos. 4,454,317 and 4,801,663; quaternary ammonium phenolates with a zwitterionic structure of the type described in U.S. Pat. No. 4,335,219; ammonium phosphonates and phosphates of the type described in U.S. Pat. No. 4,499,253; alkali carboxylates of the type described in DE-OS 3,219,608; basic alkali metal salts complexed with acyclic organic compounds as described in U.S. Pat. No. 4,379,905 such as potassium acetate complexed with a polyethylene glycol which contains an average of 5 to 8 ethylene oxide units; basic alkali metal salts complexed with crown ethers as described in U.S. Pat. No. 4,487,928; aminosilyl group-containing compounds such as aminosilanes, diaminosilanes, silylureas and silazanes as described in U.S. Pat. No. 4,412,073; and mixtures of alkali metal fluorides and quaternary ammonium or phosphonium salts as described in U.S. patent Ser. No. 07/391,213. If it is desired to introduce allophanate groups into the resulting product, the trimerization catalysts should also catalyze the formation of allophanate groups from urethane groups.

Phosphines, such as those described in DE-OS 1,935,763, may also be used for preparing the products of the present invention. The phosphines, in addition to promoting the trimerization reaction, also promote the dimerization of diisocyanates.

Particularly suitable as catalysts for the process according to the invention are quaternary ammonium hydroxides corresponding to the formula

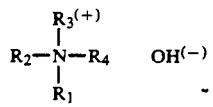

as described in U.S. Pat. No. 4,324,879 and German Offenlegungsschriften 2,806,731 and 2,901,479. Preferred quaternary ammonium hydroxides are those wherein the radicals $R_1$ to $R_4$ represent identical or different alkyl or aralkyl groups having from 1 to 20, preferably from 1 to 4 carbon atoms, which may optionally be substituted by hydroxyl groups. Two of the radicals $R_1$ to $R_4$ may form a heterocyclic ring having from 3 to 5 carbon atoms together with the nitrogen atom and optionally with a further nitrogen or oxygen atom. Also the radicals $R_1$ to $R_3$ in each case may represent ethylene radicals which form a bicyclic triethylene diamine structure together with the quaternary nitrogen atom and a further tertiary nitrogen atom, provided that the radical $R_4$ then represents a hydroxyalkyl group having from 2 to 4 carbon atoms in which the hydroxyl group is preferably arranged in a 2-position to the quaternary nitrogen atom. The hydroxyl-substituted radical or the hydroxyl-substituted radicals may also contain other substituents, particularly $C_1$ to $C_4$-alkoxy substituents.

The production of these quaternary ammonium catalysts takes place in known manner by reacting a tertiary amine with an alkylene oxide in an aqueous-alcoholic medium (c.f. U.S. Pat. No. 3,995,997, col. 2, lines 19-44). Examples of suitable tertiary amines include trimethylamine, tributylamine, 2-dimethylaminoethanol, triethanolamine, dodecyldimethylamine, N,N-dimethylcyclohexylamine, N-methylpyrrolidine, N-methylmorpholine and 1,4-diazabicyclo-[2,2,2]-octane. Examples of suitable alkylene oxides include ethylene oxide, propylene oxide, 1,2-butylene oxide, styrene oxide and methoxy, ethoxy or phenoxy propylene oxide. The most preferred catalysts from this group are N,N,N-trimethyl-N-(2-hydroxyethyl)-ammonium hydroxide and N,N,N-trimethyl-N-(2-hydroxypropyl)ammonium hydroxide. Another most preferred catalyst is N,N,N-trimethyl-N-benzyl-ammonium hydroxide. The trimerization of the starting diisocyanate mixture may be carried out in the absence or in the presence of solvents which are inert to isocyanate groups. Depending upon the area of application of the products according to the invention, low to medium-boiling solvents or high-boiling solvents can be used. Suitable solvents include aromatic compounds such as toluene or xylene; halogenated hydrocarbons such as methylene chloride and trichloroethylene; ethers such as diisopropylether; and alkanes such as cyclohexane, petroleum ether or ligroin.

The trimerization catalysts are generally used in quantities of about 0.0005 to 5% by weight, preferably about 0.002 to 2% by weight, based on the diisocyanate used. If, for example, a preferred catalyst such as N,N,N-trimethyl-N(2-hydroxypropyl)-ammonium hydroxide is used, then quantities of about 0.0005 to 1% by weight, preferably about 0.001 to 0.02 by weight, based on starting diisocyanate, are generally sufficient. The catalysts may be used in pure form or in solution. The previously named solvents which are inert to isocyanate groups are suitable as solvents, depending upon the type of catalysts. Dimethyl formamide or dimethyl sulphoxide may also be used as solvents for the catalysts.

The simultaneous use of co-catalysts is possible in the process according to the invention, but not necessary. All substances which have a polymerizing effect on isocyanates are suitable as co-catalysts such as those described in DE-OS 2,806,731 and U.S. Pat. No. 3,487,080. Particularly preferred co-catalysts are monoalcohols which react with a minor portion of the starting diisocyanate to form urethane groups. In addition, these co-catalysts can be used as solvents for the trimerization catalyst. The co-catalysts are optionally used in an amount 0.1 to 2% by weight, preferably 0.2 to 0.8% by weight, based on the weight of the starting diisocyanate.

The reaction temperature for isocyanurate formation in accordance with the present invention is about 10° to 160° C., preferably about 50° to 150° C. and more preferably about 60° to 90° C.

The process according to the invention may take place either batchwise or continuously, for example, as described below. The starting diisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. The optional monoalcohol co-catalyst may be introduced into the reaction vessel in accordance with several embodiments. The monoalcohol may be prereacted with the starting diisocyanate to form urethane groups prior to its introduction into the reaction vessel; the monoalcohol may be mixed with the diisocyanate and introduced into the reaction vessel; the monoalcohol may be separately added to the reaction vessel either before or after, preferably after, the diisocyanate has been added; or, preferably, the catalyst may be dissolved in the monoalcohol prior to introducing the solution into the reaction vessel.

In the presence of the required catalyst or catalyst solution the trimerization begins and is indicated by an exothermic reaction. The progress of the reaction is followed by determining the NCO content by a suitable method such as titration, refractive index or IR analysis. From the NCO content it is possible to readily determine the percentage of isocyanate groups which have been trimerized. The reaction is terminated at the desired degree of trimerization.

The termination of the trimerization reaction can take place, for example, by the addition of a catalyst-poison of the type named by way of example in the above-mentioned literature references. For example, when using basic catalysts the reaction is terminated by the addition of a quantity, which is at least equivalent to the catalyst quantity, of an acid chloride such as benzoyl chloride or diethylhexyl phosphate. When using heat-labile catalysts, for example, the previously described quaternary ammonium hydroxides, poisoning of the catalyst by the addition of a catalyst poison may be dispensed with since these catalysts decompose in the course of the reaction. When using such catalysts, the catalyst quantity and the reaction temperature are preferably selected such that the catalyst which continuously decomposes is totally decomposed when the desired degree of trimerization is reached. The quantity of catalyst or reaction temperature which is necessary to achieve this decomposition can be determined by a preliminary experiment. It is also possible initially to use a lesser quantity of a heat sensitive catalyst than is necessary to achieve the desired degree of trimerization and to subsequently catalyze the reaction by a further incremental addition of catalyst, whereby the quantity of catalyst added later is calculated such that when the desired degree of trimerization is achieved, the total quantity of catalyst has decomposed. The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. One of the primary advantages of the present invention is that it is not necessary to remove unreacted HMDI from the reaction mixture.

The partial trimers according to the invention are valuable starting materials for one-component polyurethane coating compositions in which the isocyanate groups are used in a form blocked by known blocking agents. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as ε-caprolactam and δ-valerolactam; oximes such as methyl ethyl ketoxime (butanone oxime), methyl amyl ketoxime and cyclohexanone oxime; mercaptans such as methyl mercaptan, ethyl mercaptan, butyl mercaptan, 2-mercaptobenzthiazole, α-naphthyl mercaptan and dodecyl mercaptan; and triazoles such as 1H-1,2,4-triazole.

Preferred blocking agents are the oximes; methyl ethyl ketoxime is especially preferred.

Reaction partners for the partial trimers according to the invention are polyhydroxyl polyesters and polyhydroxyl polyacrylates. The polyester polyols contain at least 2 preferably 2 to 15 and more preferably 2 to 6 hydroxyl groups, and have a molecular weight of 400 to 6,000, preferably 800 to 3,000. The molecular weights are number average molecular weights ($M_n$) and are determined by end group analysis (OH number). In accordance with the present invention the polyhydroxyl polycarbonates are included with the polyester polyols.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine, trimethlyolpropane, 1,2,6hexane triol, 1,2,4-butane triol, trimethylol ethane, pentaerythritol, mannitol, sorbitol, sucrose, hydroquinone and 1,1,1- or 1,1,2- tris-(hydroxylphenyl)-ethane. The polyesters may also contain a portion of carboxyl end groups. Polyesters of lactones, e.g. ε-caprolactone or hydroxycarboxylic acids, e.g. -hydroxycaproic acid, may also be used.

Polycarbonates containing hydroxyl groups include those known such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained form the above-mentioned polyesters or polylactones with phosgene, diaryl carbonates or cyclic carbonates.

The polyhydroxy polyacrylates preferably have at least two alcoholic hydroxyl groups per molecule as a statistical average, although a small portion of monohydroxyl compounds may be present. The polyhydroxy polyacrylates may be prepared by known methods such as those described in European Patent Office Publication 68,383, German Patentschrift 2,460,329, British Patent 1,515,868, U.S. Pat. No. 3,002,959, U.S. Pat. No. 3,375,227 or German Auslegeschrift 1,038,754. The polyhydroxy polyacrylates are generally prepared by the radical polymerization or copolymerization of a hydroxyalkyl ester of an unsaturated carboxylic acid, preferably acrylic or methacrylic acid, with itself or preferably together other hydroxyl-free unsaturated monomers.

Suitable hydroxylalkyl esters include esters containing 2 to 8, preferably 2 to 4 carbon atoms in the alkyl group and obtained from $\alpha$, $\beta$-unsaturated carboxylic acids having 3 to 5 carbon atoms, such as acrylic, methacrylic, fumaric, maleic, itaconic or crotonic acid. The acrylic and methacrylic acid esters are preferred. Hydroxyalkyl esters of the above-mentioned acids containing ether bridges in the alkyl groups may also be used but are less preferred. The particularly preferred monomers with alcoholic hydroxyl groups include the 2-hydroxyethyl-, 2- and 3-hydroxypropyl-, and 2-, 3- and 4-hydroxybutyl-acrylates and -methacrylates. These monomers containing alcoholic hydroxyl groups may be prepared, for example, by the reaction of the above-mentioned acids with epoxides such as alkylene or propylene oxide.

The polyhydroxy polyacrylates which are used may also be prepared by reacting the corresponding polyacrylates containing carboxylic acid groups with alkylene oxides such as propylene oxide and/or ethylene oxide in the presence of suitable alkoxylation catalysts such as tetrabutylammonium bromide. The starting materials for this alkoxylation reaction, i.e., the polyacrylates containing carboxylic acid groups, are obtained in known manner by the copolymerization of unsaturated carboxylic acids such as acrylic acid and/or methacrylic acid with unsaturated comonomers which do not contain carboxyl or hydroxyl groups. The preferred method for preparing the polyhydroxy polyacrylates is the copolymerization of the hydroxyalkyl esters of unsaturated carboxylic acids previously set forth.

The comonomers used for the above-mentioned hydroxyl group-containing monomers may be any $\alpha,\beta$-olefinically unsaturated compounds in the molecular weight range of 28 to 350 which are free from hydroxyl groups such as ethylene, propylene, butene-1, hexene-1, octene-1, styrene, $\alpha$-methylstyrene, divinyl benzene, various isomeric vinyl toluenes, esters of $\alpha,\beta$-unsaturated carboxylic acids of the type exemplified above monohydric aliphatic alcohols having 1 to 18, preferably 1 to 10 carbon atoms, in particular the corresponding esters of acrylic or methacrylic acids such as the methyl, ethyl, N-butyl, N-pentyl, N-hexyl, 2-ethylhexyl or octadecyl esters of acrylic or methacrylic acid.

Neutral esters of polycarboxylic acids are also suitable comonomers, for example, itaconic, crotonic, maleic or fumaric esters of the monohydric alcohols exemplified above.

Acrylic acid, methacrylic acid, vinyl acetate, acrylonitrile, methacrylonitrile and dienes such as isoprene or or butadiene are all suitable comonomers. Vinyl chloride may in principle also be used as a comonomer.

Particularly preferred polyhydroxy polyacrylates are obtained from about 10 to 50 parts by weight of hydroxyalkyl esters of acrylic or methacrylic acid, 0 to 80 parts by weight of styrene and/or $\alpha$-methylstyrene, about 10 to 90 parts by weight of an acrylic and/or methacrylic acid ester free from hydroxyl group of the type exemplified above and 0 to about 5 parts by weight of an $\alpha,\beta$-unsaturated mono- or dicarboxylic acid of the type exemplified, in particular acrylic acid or methacrylic acid.

The compositions may also contain a low molecular weight isocyanate-reactive component having an average molecular weight of up to 400. The low molecular weight compounds which may optionally be used in combination with the high molecular weight polyhydroxyl polyesters and polyhydroxyl polyacrylates include the polyhydric alcohols which have been described for the preparation of the polyester polyols and also the low molecular weight polyamines which are known from polyurethane chemistry.

The amounts of the partial trimer and polyhydroxyl compounds are selected to provide an equivalent ratio of isocyanate groups (whether present in blocked or unblocked form) to isocyanate-reactive groups of about 0.8 to 3, preferably about 0.9 to 2.0 and more preferably about 1.0 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methylpiperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The coating compositions containing the polyisocyanates according to the invention provide coatings which adhere surprisingly well to a variety of materials including metal substrates and basecoats (especially those used in the automotive industry), and are particularly light-fast, color-stable in the presence of heat and very resistant to abrasion. Furthermore, they are characterized by high hardness, elasticity, very good resistance to chemicals, high gloss, excellent weather resistance, excellent environmental etch resistance and good pigmenting qualities.

The invention is further illustrated, but is not intended to be limited by the following examples in which all parts and percentages are by weight unless otherwise specified. Isocyanate contents and equivalents weights are based on the weight of the solution unless otherwise specified.

EXAMPLES

Polyisocyanate I—Preparation of partially trimerized HMDI

A round bottom flask was charged with 2990.2 g of HMDI and 747.55 g of xylene. A nitrogen inlet tube was placed into the solution and a slow stream of nitrogen was bubbled through for two hours. The solution was heated to 70° C. and 15.94 g of a catalyst solution was added. The catalyst solution was prepared by mixing 47.2 g of a 40% benzyltrimethylammonium hydroxide solution in methanol with 59.9 g of 1-butanol. The temperature began to rise from the exothermic reaction. The reaction temperature was maintained between 70° and 83° C. until an isocyanate content of 13.48 was obtained by titration. This took approximately 1.5 hours. 6.18 g of diethylhexyl phosphate was then added to inactivate the catalyst. The product had a viscosity of 190,000 mPa.s. To reduce the viscosity 534.0 g of xylene was added. The final product had a viscosity of 3,090 mPa.s at 25° C., a solids content of 70%, an isocyanate content of 11.72%, and an equivalent weight of 358.4 g/eq.

Polyisocyanate II

An isocyanurate group-containing polyisocyanate prepared by trimerizing a portion of the isocyanate groups of 1,6-hexamethylene diisocyanate and having an isocyanate content of 21.6% by weight, a content of monomeric diisocyanate of <0.2% and a viscosity at 20° C. of 3000 mPa.s.

Polyisocyanate III

An isocyanurate group-containing polyisocyanate present as a 70% solution in 1:1 blend of propylene glycol monomethyl ether acetate and xylene and prepared by trimerizing a portion of the isocyanate groups of isophorone diisocyanate, wherein the solution has an isocyanate content of 11.7% by weight, a content of monomeric diisocyanate of <0.5% and a viscosity at 20° C. of 1300 to 2700 mPa.s.

Polyisocyanate IV

A blend of 40% Polyisocyanate II and 60% Polyisocyanate III, wherein the percentages are based on solids.

Polyisocyanate V—Preparation of partially trimerized IPDI

A round bottom flask was charged with 1000 g of IPDI and 428.6 g of xylene. A nitrogen inlet tube was placed into the solution and a slow stream of nitrogen was bubbled through for two hours. The solution was heated to 70° C. and 5.0 g of a catalyst solution was added. The catalyst solution was prepared by mixing 47.2 g of a 40% benzyltrimethylammonium hydroxide solution in methanol with 59.9 g of 1-butanol. The temperature began to rise from the exothermic reaction. The reaction temperature was maintained between 70° and 80° C. until an isocyanate content of 12.9% was obtained by titration. This took approximately 1.5 hours. 1.92 g of diethylhexyl phosphate the final product was 736 mPa.s at 23° C.

Blocked Polyisocyanate I—Preparation of a blocked, partially trimerized HMDI A round bottom flask was charged with 716.8 g (2.0 eq) of the partially trimerized HMDI described in the preceding example. To this stirred solution was slowly added 175.74 (2.02 eq) of methyl ethyl ketoxime, while cooling the flask with a water bath. The temperature was not allowed to exceed 80° C. After the addition was complete, the mixture was stirred at 70° C. for 1 to 2 hours until the isocyanate content was 0.13%. Because this product was very viscous 149.77 g of propylene glycol monomethyl ether acetate was added to reduce the viscosity. The final product had a viscosity of 23,000 mPa.s at 25° C., a solids content of 65%, a blocked isocyanate content of 8.06%, and an equivalent weight of 521.1 g/eq.

Blocked Polyisocyanate II

Blocked Polyisocyanate I was repeated except that the methyl isobutyl ketone was used in place of propylene glycol monomethyl ether acetate.

Blocked Polyisocyanate III

A blocked polyisocyanate prepared by blocking Polyisocyanate II with methyl ethyl ketoxime as described for the preparation of Blocked Polyisocyanate I.

Blocked Polyisocyanate IV

A blocked polyisocyanate prepared by blocking Polyisocyanate III with methyl ethyl ketoxime as described for the preparation of Blocked Polyisocyanate I.

Blocked Polyisocyanate V

A blend of 40% Blocked Polyisocyanate III and 60% Blocked Polyisocyanate IV, wherein the percentages are based on solids.

Blocked Polyisocyanate VI and VII—Preparation of blocked, partially trimerized HMDI's In two separate experiments a round bottom flask was charged with 69.66 g of HMDI and 29.86 g of xylene. A nitrogen inlet tube was placed into the solution and a slow stream of nitrogen was bubbled through for two hours. The solution was heated to 70° C. and 0.348 g of the catalyst solution was added. The catalyst solution was prepared by mixing 47.2 g of a 40% benzyltrimethylammonium hydroxide solution in methanol with 59.9 g of 1-butanol. The temperature began to rise from the exothermic reaction. The reaction temperature was maintained between 70° and 80° C. until the isocyanate content set forth in the following table was obtained by titration. This took approximately 1.5 hours. 0.132 g of diethylhexyl phosphate was then added to inactivate the catalyst.

In separate experiments a round bottom flask was charged with 1.0 eq of the two partially trimerized HMDI's and sufficient propylene glycol monomethyl ether acetate to obtain a solids content of 65%. To this stirred solution was slowly added 1.01 eq of methyl ethyl ketoxime, while cooling the flask with a water bath. The temperature was not allowed to exceed 80° C.

After the addition was complete, the mixture was stirred at 70° C. for 1 to 2 hours until the isocyanate content was less than 0.2%. The viscosity and equivalent weight of the final product, which are dependent upon the isocyanate content of the unblocked partial trimer, are set forth in the table.

| Blocked Isocyanate | Isocyanate Content | Viscosity at 25° C. | Equivalent Weight |
|---|---|---|---|
| VI | 15.68 | 1050 | 422.5 |
| VII | 13.82 | 3140 | 461.1 |

Blocked Polyisocyanate VIII—Preparation of a blocked, partially trimerized IPDI

A round bottom flask was charged with 1.0 eq of the Polyisocyanate V and sufficient propylene glycol monomethyl ether acetate to obtain a solids content of 65%. To this stirred solution was slowly added 1.01 eq of methyl ethyl ketoxime, while cooling the flask with a water bath. The temperature was not allowed to exceed 80° C. After the addition was complete, the mixture was stirred at 70° C. for 1 to 2 hours until the isocyanate content was less than 0.2%. The product had a viscosity of 3820 mPa.s at 25° C. and an equivalent weight of 485.

Polyol I

A polyacrylate polyol having an OH equivalent weight of 607, an OH content of 2.8% and an acid number of <10, present as a 65% solution in a 3:1 mixture of butyl acetate and xylene, and prepared from 41.95% styrene, 32.53% hydroxyethyl methacrylate, 24.57% butylacrylate and 0.95% acrylic acid.

Polyol II

A polyacrylate/polyester polyol mixture having an OH equivalent weight of 630, an OH content of 2.7% and an acid number of <10, present as a 65% solution in xylene, and containing 20% of Polyol 3 and 45% of Polyol 4.

Polyol III

A polyester polyol having an OH equivalent weight of 400, an OH content of 4.25% and a functionality of about 3.1 and prepared from 34.6 parts 1,6-hexane diol, 9.8 parts trimethylol propane, 30.43 parts isophthalic acid, 5.4 parts phthalic acid anhydride and 10.7 parts adipic acid.

Polyol IV

A polyacrylate polyol prepared from 26.07% styrene, 26.07% hydroxyethyl acrylate, 46.88% butylacrylate and 0.98% acrylic acid.

Catalyst

A 1% solution in propylene glycol monomethyl ether acetate of dibutyltin dilaurate (available as T-12 from Air Products and Chemicals).

Additive A

A polyether modified dimethylpolysiloxane copolymer flow aid (available as Byk 301 from Byk Chemie).

Additive B

A hindered amine light stabilizer (available as Tinuvin 292 from Ciba-Geigy).

Additive C

A benzotriazole light stabilizer (available as Tinuvin 1130 from Ciba-Geigy).

EXAMPLE 1

A coating composition was prepared by mixing Blocked Polyisocyanate I with the polyol set forth in Table 1 at the NCO/OH equivalent ratio set forth in Table 1. The coating composition also contained 1% of Additive A, 1.3% of Additive B, 1.3% of Additive C and the amount of Catalyst set forth in the Table, wherein all of the percentages are based on resin solids. A 1:1:1 blend of methyl amyl ketone, xylene and methyl isobutyl ketone was added until the coating composition had a viscosity of 20 sec. as measured using a #4 Ford cup at room temperature.

Panels were sprayed over commercial black basecoats and placed outdoors laying horizontally in Florida and were rated from 0 to 10 for environmental etch resistance every two weeks.

0=No Etch
1=Very Minor Etch
2-3=Slight Etch
4-6=Moderate Etch
7-10=Total Failure

TABLE 1

| Panel | Polyol | NCO/OH | Catalyst | 4 wks | 6 wks | 8 wks | 10 wks | 12 wks | 14 wks | 16 wks | 18 wks | 22 wks |
|---|---|---|---|---|---|---|---|---|---|---|---|---|
| 1 | Polyol II | 1.1 | .05 | 1 | 1 | 1 | 3 | 3 | 4 | 1 | 2 | 1 |
| 2 | Polyol II | 1.1 | .1 | 1 | 1 | 1 | 3 | 3 | 4 | 1 | 2 | 1 |
| 3 | Polyol II | 1.5 | .1 | 1 | 0 | 1 | 3 | 2 | 2 | 1 | 2 | 1 |
| 4 | Polyol I | 1.5 | .1 | 0 | 1 | 1 | 2 | 1 | 1 | 1 | 1 | 1 |
| 5 | Polyol I | 1.1 | .1 | 1 | 1 | 1 | 2 | 2 | 3 | 1 | 2 | 1 |
| 6 | Polyol I | 1.1 | .05 | 1 | 1 | 1 | 2 | 2 | 3 | 1 | 2 | 1 |

EXAMPLE 2

A coating composition was prepared by mixing the blocked polyisocyanate set forth in Table II with Polyol II at an NCO/OH equivalent ratio of 1.1:1. The coating composition also contained 0.1% Catalyst, 1% of Additive A, 1.3% of Additive B and 1.3% of Additive C, wherein all of the percentages are based on resin solids. A 1:1:1 blend of methyl amyl ketone, xylene and methyl isobutyl ketone was added until the coating composition had a viscosity of 20 sec. as measured using a #4 Ford cup at room temperature. The values set forth in Table 2 are the average for two panels.

TABLE 2

| Panel | Polyisocyanate | 2 wks | 4 wks | 6 wks | 8 wks | 12 wks |
|---|---|---|---|---|---|---|
| 1 | Polyisocyanate IV | 2 | 3 | 5 | 4.5 | 2 |

TABLE 2-continued

| Panel | Polyisocyanate | 2 wks | 4 wks | 6 wks | 8 wks | 12 wks |
|---|---|---|---|---|---|---|
| 2 | Blocked Polyisocyanate II | 1.5 | 2 | 3 | 1 | 1 |
| 3 | Blocked Polyisocyanate V | 4 | 2.5 | 4 | 2.5 | 3 |

EXAMPLE 3

Coating compositions were prepared by mixing the polyisocyanate or blocked polyisocyanates set forth in Table III with Polyol II at an NCO/OH equivalent ratio of 1.3:1. The coating compositions also contained 0.1% Catalyst, 1% of Additive A, 1.3% of Additive B and 1.3% of Additive C, wherein all of the percentages are based on resin solids. A 1:1:1 blend of methyl amyl ketone, xylene and methyl isobutyl ketone was added until the coating compositions had a viscosity of 20 sec. as measured using a #4 Ford cup at room temperature. The coating compositions were applied to panels as described in Example 1. Three panels were prepared for each coating composition, one was cured at 250° F., one at 275° F. and one at 300° F. The cured panels were tested for environmental etch, solvent resistance and hardness. The panels were then rated best (1), second best (2) and worst (3). The results are set forth in Table 3.

TABLE 3

| | Etch Resistance Temp., °F. | | | Solvent Resistance Temp., °F. | | | Hardness Temp., °F. | | |
|---|---|---|---|---|---|---|---|---|---|
| Polyisocyanate | 250 | 275 | 300 | 250 | 275 | 300 | 250 | 275 | 300 |
| Blocked Polyisocyanate II | 1 | 1 | 1 | 1 | 1 | 1 | 1 | 1 | 1 |
| Blocked Polyisocyanate V | 3 | 3 | 3 | 3 | 3 | 1 | 1 | 1 | 1 |
| Polyisocyanate IV | 1 | 2 | 1 | 1 | 1 | 1 | 1 | 3 | 1 |

Etch resistance was determined using 5 solutions

| | Etch resistance was determined using 5 solutions | |
|---|---|---|
| 1 | Tap water | |
| 2 | 1% hydrochloric acid | |
| 3 | 2% hydrochloric acid | |
| 4 | 0.01N sulfuric acid | |
| 5 | Acid rain spot | 41% sulfuric acid |
| | | 21% nitric acid |
| | | 4% hydrochloric acid |
| | | 34% ammonium hydroxide |
| | pH = 3 | |

Solutions 1–5 were pipetted as 50 microliter droplets onto a test panel using a 150 microliter micropipette (3 droplets for each solution) to ensure uniform distribution of the test solutions. The panels were then placed in a 150° F. oven for 1 hour. Solution 5 was repeated by pipetting as described previously onto a test panel and baked for 15 hours at 150° F.

The spots were then rated on a scale of 0–5 (0=no etch damage and 5=failure or severe etch damage) and a total etch number was assigned. A ranking of best to worst for each system was then assigned.

Solvent resistance was determined by wetting cheesecloth with methyl ethyl ketone and then rubbing each panel 100 times. A double rub consists of one back and forth rub against the coated panel. Following a five minute waiting period after the rubs were completed, each panel was scratched with a thumb nail. If there was no evidence of film destruction, the films were rated as passing.

Pendulum Hardness was determined by evaluating coated panels of a Pendulum Hardness Tester. The tester was levelled, and at the desired interval of measurement the metal plate was placed on the sample stage of the tester. The fulcrum points of the pendulum were lowered onto the curing film, the pendulum was deflected 6° and released. The time for the pendulum to damp to a 3° deflection was recorded.

EXAMPLE 4

Coating compositions were prepared by mixing the polyisocyanate or blocked polyisocyanates set forth in Table IV with Polyol II at an NCO/OH equivalent ratio of 1.3:1. The coating compositions also contained 0.1% Catalyst, 1% of Additive A, 1.3% of Additive B and 1.3% of Additive C, wherein all of the percentages are based on resin solids. A 1:1:1 blend of methyl amyl ketone, xylene, and methyl isobutyl ketone was added until the coating compositions had a viscosity of 20 sec. as measured using a #4 Ford cup at room temperature. The coating compositions were applied to panels as described in Example 3 and cured at 300° F. The cured panels were tested for environmental etch, solvent resistance and hardness using the procedures described in Example 3. The panels were then rated best (1), second best (2) and worst (3). The results are set forth in Table 4.

TABLE 4

| Polyisocyanate | Etch Resistance | Solvent Resistance | Hardness |
|---|---|---|---|
| Blocked Polyisocyanate VI | 1 | 1 | 1 |
| Blocked Polyisocyanate VII | 2 | 1 | 1 |
| Polyisocyanate IV | 3 | 1 | 1 |

The examples demonstrate that coatings prepared from one-component systems containing the blocked polyisocyanates of the present invention possess excellent acid etch resistance when compared to one-component systems which correspond to the existing two-component systems, i.e., systems prepared by blocking the isocyanate component of the two-component system to obtain a one-component system. The examples also demonstrate that when all of the properties are evaluated, the one-component systems according to the invention can be used to prepare coatings which possess properties which are equal to or better than the properties of coatings prepared from the corresponding two-component system.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blocked polyisocyanate reaction product of a polyisocyanate with a reversible, monofunctional blocking agent for isocyanate groups other than ε-caprolactam, wherein the polyisocyanate is prepared by trimerizing 5 to 85% of the isocyanate groups of a cyclic organic diisocyanate having (cyclo)aliphatically bound isocyanate groups and contains I) an isocyanurate group-containing polyisocyanate and II) at least 5% by weight, based on the weight of the polyisocyanate, of unreacted diisocyanate.

2. The blocked polyisocyanate of claim 1 wherein 10 to 75% of the isocyanate groups are trimerized.

3. The blocked polyisocyanate of claim 1 wherein said cyclic organic diisocyanate comprises bis-(4-isocyanatocyclohexyl)-methane.

4. The blocked polyisocyanate of claim 2 wherein said cyclic organic diisocyanate comprises bis-(4-isocyanatocyclohexyl)-methane.

5. The blocked polyisocyanate of claim 1 wherein said monofunctional blocking agent comprises methyl ethyl ketoxime.

6. The blocked polyisocyanate of claim 2 wherein said monofunctional blocking agent comprises methyl ethyl ketoxime.

7. The blocked polyisocyanate of claim 3 wherein said monofunctional blocking agent comprises methyl ethyl ketoxime.

8. The blocked polyisocyanate of claim 4 wherein said monofunctional blocking agent comprises methyl ethyl ketoxime.

9. A one-component coating composition which comprises a) a blocked polyisocyanate reaction product of a polyisocyanate with a reversible, monofunctional blocking agent for isocyanate groups other than ε-caprolactam, wherein the polyisocyanate is prepared by trimerizing 5 to 85% of the isocyanate groups of a cyclic organic diisocyanate having (cyclo)aliphatically bound isocyanate groups and contains i) an isocyanurate group-containing polyisocyanate and ii) at least 5% by weight, based on the weight of the polyisocyanate, of unreacted diisocyanate, and b) a polyhydroxyl polyacrylate and/or a polyhydroxyl polyester.

10. The one-component coating composition of claim 9 wherein 10 to 75% of the isocyanate groups are trimerized.

11. The one-component coating composition of claim 9 wherein said cyclic organic diisocyanate comprises bis-(4-isocyanatocyclohexyl)-methane.

12. The one-component coating composition of claim 10 wherein said cyclic organic diisocyanate comprises bis-(4-isocyanatocyclohexyl)-methane.

13. The one-component coating composition of claim 9 wherein said monofunctional blocking agent comprises methyl ethyl ketoxime.

14. The one-component coating composition of claim 10 wherein said monofunctional blocking agent comprises methyl ethyl ketoxime.

15. The one-component coating composition of claim 11 wherein said monofunctional blocking agent comprises methyl ethyl ketoxime.

16. The one-component coating composition of claim 12 wherein said monofunctional blocking agent comprises methyl ethyl ketoxime.

17. A coated substrate which is coated with the one-component coating composition of claim 9.

18. The coated substrate of claim 17 wherein said substrate is initially coated with a acrylic/melamine thermoset basecoat.

19. A blocked polyisocyanate reaction product of a polyisocyanate with a ε-caprolactam, wherein the polyisocyanate is prepared by trimerizing 5 to 85% of the isocyanate groups of a cyclic organic diisocyanate having (cyclo)aliphatically bound isocyanate groups other than isophorone diisocyanate and contains i) an isocyanurate group-containing polyisocyanate and (ii) at least 5% by weight, based on the weight of the polyisocyanate, of unreacted diisocyanate.

20. A one-component coating composition which comprises a) a blocked polyisocyanate reaction product of a polyisocyanate with ε-caprolactam, wherein the polyisocyanate is prepared by trimerizing 5 to 85% of the isocyanate groups of a cyclic organic diisocyanate having (cyclo)aliphatically bound isocyanate groups other than isophorone diisocyanate and contains i) an isocyanurate group-containing polyisocyanate and ii) at least 5% by weight, based on the weight of the polyisocyanate, of unreacted diisocyanate, and b) a polyhydroxyl polyacrylate and/or a polyhydroxyl polyester.

21. A solution in an organic solvent of a blocked polyisocyanate reaction product of a polyisocyanate with a ε-caprolactam, wherein the polyisocyanate is prepared by trimerizing 5 to 85% of the isocyanate groups of a cyclic organic diisocyanate having (cyclo)aliphatically bound isocyanate groups and contains i) an isocyanurate group-containing polyisocyanate and ii) at least 5% by weight, based on the weight of the polyisocyanate, of unreacted diisocyanate.

22. A one-component, solvent-containing coating composition which comprises a) a blocked polyisocyanate reaction product of a polyisocyanate with ε-caprolactam, wherein the polyisocyanate is prepared by trimerizing 5 to 85% of the isocyanate groups of a cyclic organic diisocyanate having (cyclo)aliphatically bound isocyanate groups and contains i) an isocyanurate group-containing polyisocyanate and ii) at least 5% by weight, based on the weight of the polyisocyanate, of unreacted diisocyanate, and b) a polyhydroxyl polyacrylate and/or a polyhydroxyl polyester.

23. A one-component coating composition which comprises a) a blocked polyisocyanate reaction product of a polyisocyanate with ε-caprolactam, wherein the polyisocyanate is prepared by trimerizing 5 to 85% of the isocyanate groups of a cyclic organic diisocyanate having (cyclo)aliphatically bound isocyanate groups and contains i) an isocyanurate group-containing polyisocyanate and ii) at least 5% by weight, based on the weight of the polyisocyanate, of unreacted diisocyanate, and b) a polyhydroxyl polyacrylate.

* * * * *